United States Patent
Zhu et al.

(10) Patent No.: US 7,703,973 B2
(45) Date of Patent: Apr. 27, 2010

(54) BACKLIGHT MODULE

(75) Inventors: Jun Zhu, Beijing (CN); Guo-Fan Jin, Beijing (CN)

(73) Assignees: Tsinghua University, Beijing (CH); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 24 days.

(21) Appl. No.: 11/953,673

(22) Filed: Dec. 10, 2007

(65) Prior Publication Data
US 2009/0034264 A1     Feb. 5, 2009

(30) Foreign Application Priority Data
Aug. 3, 2007     (CN) ............... 2007 1 0075618

(51) Int. Cl.
  *F21V 7/04*     (2006.01)
(52) U.S. Cl. .............. 362/623; 362/297; 362/615; 362/617
(58) Field of Classification Search ........ 362/297, 362/615–617, 619, 623, 626
See application file for complete search history.

(56) References Cited

U.S. PATENT DOCUMENTS

| | | | |
|---|---|---|---|
| 2005/0152141 A1 * | 7/2005 | Suzuki | 362/241 |
| 2006/0164839 A1 * | 7/2006 | Stefanov | 362/327 |
| 2007/0147023 A1 * | 6/2007 | Matsushita | 362/97 |

* cited by examiner

*Primary Examiner*—Sandra L O'Shea
*Assistant Examiner*—Meghan K Dunwiddie
(74) *Attorney, Agent, or Firm*—Clifford O. Chi

(57) ABSTRACT

A backlight module includes a light source, a light guide plate and a reflector. The light guide plate includes a light incidence surface, a light-emitting surface opposite to the light incidence surface, and a pair of side surfaces connecting the light incidence surface to the light-emitting surface. The light-emitting surface of the light guide plate includes a groove formed therein. The reflector is placed between the light source and the light incidence surface of the light guide plate, and located corresponding to the groove of the light-emitting surface of the light guide plate. The reflector includes a light-receiving surface. The light source is facing the light-receiving surface of the reflector.

20 Claims, 5 Drawing Sheets

BACKLIGHT MODULE

BACKGROUND

1. Field of the Invention

The present invention relates to backlight modules, particularly, to backlight modules used in the field of liquid crystal displays (LCDs).

2. Description of Related Art

LCDs are widely used in electronic products. In an LCD device, liquid crystal is a substance that does not itself radiate light Instead, the liquid crystal receives light from a light source to display images and datas.

A conventional LCD device includes a light source, a light guide plate, a reflector, a scattering plate, and a prism system. The light source is commonly called a backlight source, since it is usually configured behind a liquid crystal panel of the liquid crystal display. A combination of all components behind the liquid crystal panel, including the light source, is generally named a backlight module. Generally, backlight modules can be classified as an edge type backlight module or as a direct type backlight modules. In the edge type backlight module, the light source is positioned adjacent to a thin edge of the light guide plate. In the direct type backlight module, the light source is positioned behind a light guide plate.

Typically, cold cathode fluorescent lamps (CCFLs) and light emitting diodes (LEDs) are employed as light sources in backlight modules. However, backlight modules employing CCFLs have the disadvantages of high-energy consumption, low uniformity of brightness, poor purity of white light, and high cost. In addition, after being used for a period of time, the brightness of CCFLs tend to become degraded, and the color of the light output is apt to shift. Accordingly, the light sources of the CCFLs generally cannot satisfy the high quality requirements of certain high-end liquid crystal displays.

Compared to CCFL light sources, light emitting diodes (LEDs) have many advantages, such as high brightness, low energy consumption, long service life, and so on. In particular, high-power LEDs are considered more suitable for certain high-end liquid crystal displays. Light-emitting diodes are reported in an article by Ya-Ju Lee entitled "High Brightness GaN-Based Light-Emitting Diodes" (Display Technology, Journal of Volume 3, Issue 2, June 2007, P 118-125), which is incorporated herein by reference.

However, each of the LEDs generally has a limited range of light emission angles. As a result, a number of dark regions are formed in areas of the light guide plate, these dark regions are generally between every two adjacent LEDs, and a number of bright regions are formed in areas of the light guide plate corresponding to each of the LEDs. That is, the backlight module has non-uniform brightness.

What is needed, therefore, is a backlight module with uniformity of output light.

SUMMARY

In one embodiment, a backlight module includes a light source, a light guide plate and a reflector. The light guide plate includes a light incidence surface, a light-emitting surface opposite to the light incidence surface, and a pair of side surfaces connecting the light incidence surface to the light-emitting surface. The light-emitting surface of the light guide plate includes a groove formed therein. The reflector is placed between the light source and the light incidence surface of the light guide plate, and located corresponding to the groove of the light-emitting surface of the light guide plate. The reflector includes a light-receiving surface. The light source is facing the light-receiving surface of the reflector.

Other advantages and novel features will become more apparent from the following detailed description of the present backlight module, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present backlight module. Moreover, in the drawings, like reference numerals designate corresponding parts throughout the several views.

DETAILED DESCRIPTION OF PREFERRED EMBODIMENTS

Reference will now be made to the drawings to describe, in detail, embodiments of the present backlight module.

Figure 1:
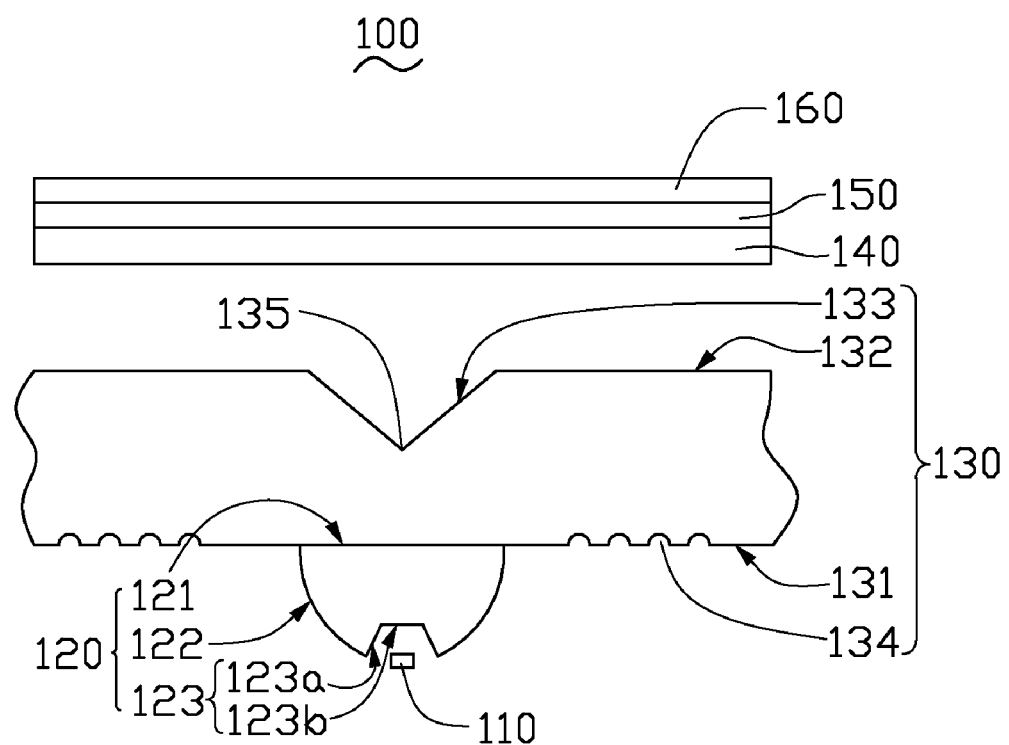
FIG. 1 is a schematic, cross-sectional view of a backlight module in accordance with a first present embodiment.

Referring to FIG. 1, a backlight module 100 in the first embodiment includes a light source 110, a reflector 120, a light guide plate 130, a micro-prism system 140, a polarization management system 150, and a scattering plate 160. The light guide plate 130 includes a light incidence surface 131, a light-emitting surface 132 opposite to the light incidence surface 131, and a pair of side surfaces (not labeled) connected to the light incidence surface 131 and the light-emitting surface 132 respectively. The light-emitting surface 132 of the light guide plate includes a groove 133.

The reflector 120 is placed between the light source 110 and the light incidence surface 131 of the light guide plate 130. Furthermore, the reflector 120 is located corresponding to the groove 133 of the light-emitting surface 132 of the light guide plate 130. The reflector 120 includes a first bottom surface 121, a light-receiving surface 123 and a first side surface 122 connecting the light-receiving surface 123 to the first bottom surface 121. The first bottom surface 121 can be planar or curved. In the first embodiment, the first bottom surface 121 is planar. The first side surface 122 is curved, such as spherically, cylindrically, conically etc. In the present embodiment, the first side surface 122 is spherically. The light-receiving surface 123 of the reflector 120 can be a concave surface of the reflector 120. In FIG. 1, the reflector 120 is shown as a conical frustum-shaped. The function of the reflector 120 is to guide the light emitted from the light source 110 into the light guide plate 130 in the form of parallel light.

The light source 110 is disposed facing the light-receiving surface 123 of the reflector 120. The light source 110 is arranged corresponding to the light-receiving surface 123 of the reflector 120. In the present embodiment, the light source 110 is arranged in the concave light-receiving surface 123. Beneficially, the light source 110 is a light-emitting diode.

The micro-prism system 140, the polarization management system 150, and the scattering plate 160 are placed, in sequence, over the side of the light-emitting surface 132 of the light guide plate 130 to disperse the output light more uniformly.

The reflector 120 is a rotating body formed via portions which are rectangular, square, trapezoidal, semicircular, triangular or the like arranged on a rotating shaft. When the reflector 120 is a rotating body formed by rectangular, square, or trapezoidal portions, the rotating body includes a first bottom surface 121, a first side surface 122, and a light-receiving surface 123 which is a groove formed in a second bottom surface opposite the first bottom surface 121. The groove may have a cylindrical, conical or pyramidal frustum, or hemispherical shape. When the groove has a cylindrical or frustum shape, the light-receiving surface 123 includes a planar bottom surface and a cylindrical side surface or conical side surface. In the first embodiment, the light-receiving surface 123 includes a planar second bottom surface 123b and a conical or pyramidal second side surface 123a. The second bottom surface 123b is parallel to the first bottom surface 121 of the reflector 120. When the groove has a hemispheroid shape, the surface of the light-receiving 123 of the reflector 120 is spherical (see FIG. 2).

When the reflector 120 is a rotating body formed by a triangle, a semicircle or otherwise a curved portion, the rotating body includes the bottom surface 121, the side surface 122, and a surface of a groove defined in the side surface 122 is the light-receiving surface 123. The groove has, beneficially, a cylinder, cone, or spheroid shape.

The light guide plate 130 includes a light incidence surface 131, a light-emitting surface 132 opposite to the light incidence surface 131, and a pair of side surfaces (not labeled) connecting the light incidence surface 131 to the light-emitting surface 132. The side surfaces are formed of a reflective film or a material/device with reflective properties. The side surfaces can reflect the received light back into the light guide plate 130. This reflection reduces the loss of light emitting from the light-emitting surface 132. The light-emitting surface 132 of the light guide plate 130 has at least one groove 133 defined therein to reflect received light. The reflector 120 is arranged facing the light incidence surface 131 of the light guide plate 130, e.g., the reflector 120 is arranged facing the light incidence surface 131 of the light guide plate 130 at a certain distance. Alternatively, the reflector 120 may contact the light incidence surface 131 of the light guide plate 130. In the present embodiment, the first bottom surface 121 of the reflector 120 is in contact with the light incidence surface 131 of the light guide plate 130, the first bottom surface 121 of the reflector 120 is arranged corresponding to the groove 133 of the light incidence surface 131 of the light guide plate 130.

The groove 133 on the light-emitting surface 132 of the light guide plate 130 may be conical, cylindrical, frustum, or hemispherical in shape. When the groove 133 has a cylinder or frustum shape, the groove 133 includes a bottom surface and a side surface. The bottom surface is, beneficially, planar and the side surface is conical or cylindrical. When the groove 133 has a cone or hemispheroid shape, the groove 133 is curved, such as being spherical or conical shaped. In the present embodiment, the surface of the groove 133 is conical, and the groove 133 has a peak 135 pointing to and distant from the light incidence surface 131.

The light incidence surface 131 of the light guide plate 130 includes, beneficially, a diffusion structure 134, e.g., diffusion dots. The function of the diffusion structure 134 is to improve the uniformity of the received light. In the present embodiment, the outlying region of the light incidence surface 131 of the light guide plate 130 is a region of the light incidence surface 131 uncovered by the reflector. The outlying region of the light incidence surface 131 has a plurality of diffusion structures 134 arranged thereon. The arrangement of the diffusion structures 134 depends on actual applications.

The surface of the groove 133 of the light-emitting surface 132 has beneficially, reflective material applied thereon to enhance the reflective effect thereof.

The micro-prism system 140, the polarization management system 150, and the scattering plate 160 are ordinary elements in the backlight module. The scattering plate 160 is arranged on the light emitting side of the light guide plate 130, facing the light-emitting surface 132. The micro-prism system 140 is disposed between the scattering plate 160 and the light-emitting surface 132 of the light guide plate 130. The micro-prism system 140 can be a light enhancing film or a reflective light enhancing film. The micro-prism system 140 plays a role of concentrating the light output by the light guiding plate 130 and enhancing the overall brightness by adjusting the light output by the light guiding plate 130. The polarization management system 150 is disposed between the micro-prism system 140 and the scattering plate 160 to control and adjust the diffusion of the light according to the direction of polarized light.

In operation, part of the light emitted from the light source 110 is refracted by the reflector 120 into parallel light. The parallel light enters the light guide plate 130 via the light incidence surface 131, and reaches the surface of the groove 133. Then is reflected by the groove 133 of the light-emitting surface 132, and arrives at the light incidence surface 131, and specifically, arrives at the outlying region of the light incidence surface 131. After that, the light is reflected by the outlying region of the light incidence surface 131 to the outlying region of the groove 133 (i.e. a region on the light-emitting surface 132 beside the groove) of the light-emitting surface 132, the light is ultimately output from the outlying region of the groove 133 of the light-emitting surface 132. Since the groove 133 is on the light-emitting surface 132, the light distribution of the region of the light-emitting surface 132 corresponding to the light source 110 is weakened. Correspondingly, the light distribution of the outlying region of the light-emitting surface 132 is enhanced. Thus, the overall light distribution of the output light is uniform, and correspondingly, the backlight module 100 has a uniform brightness.

Beneficially, the surface of the groove 133 is formed of half transparent and half reflective material. The reflective property of the half transparent and half reflective material can be adjusted to enhance the reflective effect of the conical groove 133 to different extents according to the actual applications. Thus, the distribution of light emitted from the light guide plate 130 will be adjusted and the backlight module 100 will satisfy the illumination uniformity requirements.

The reflector 120 and the light guide plate 130 are made of polymethyl ethacrylate (PMMA), glass or any other suitable transparent material. The reflector 120 and the light guide plate 130 are combined together by adhesive like light curing glue.

Figure 2:
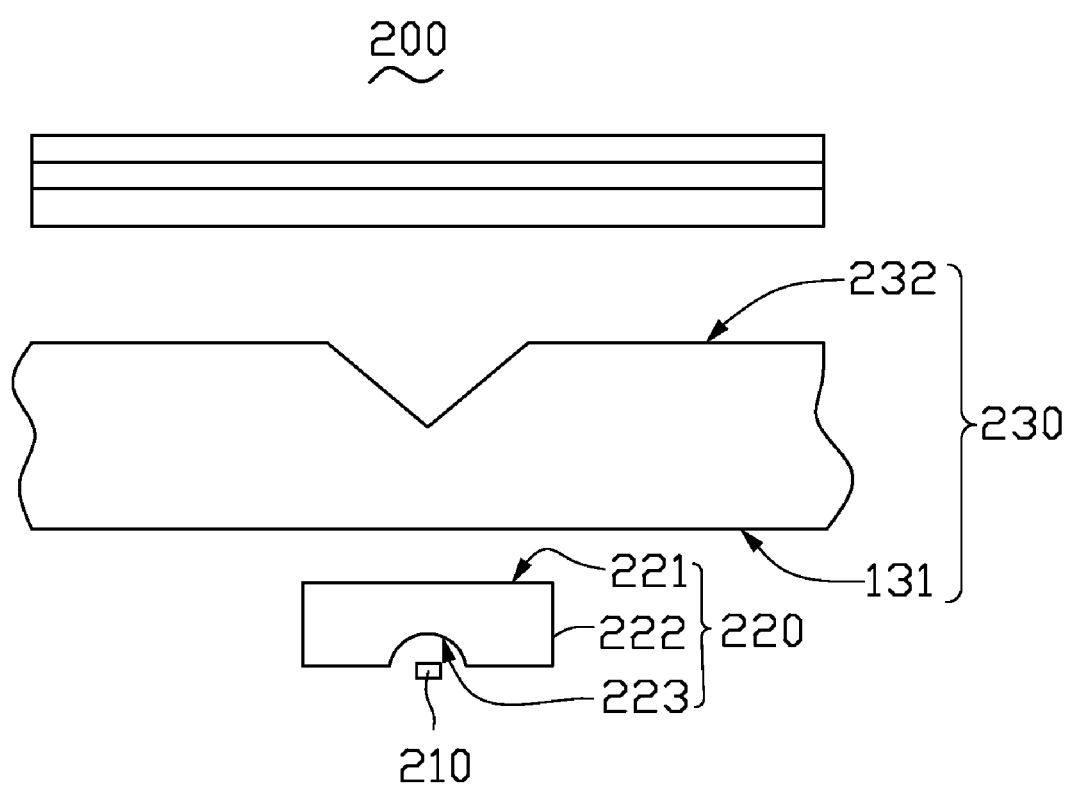
FIG. 2 is a schematic, cross-sectional view of a backlight module in accordance with a second present embodiment.
Figure 3:
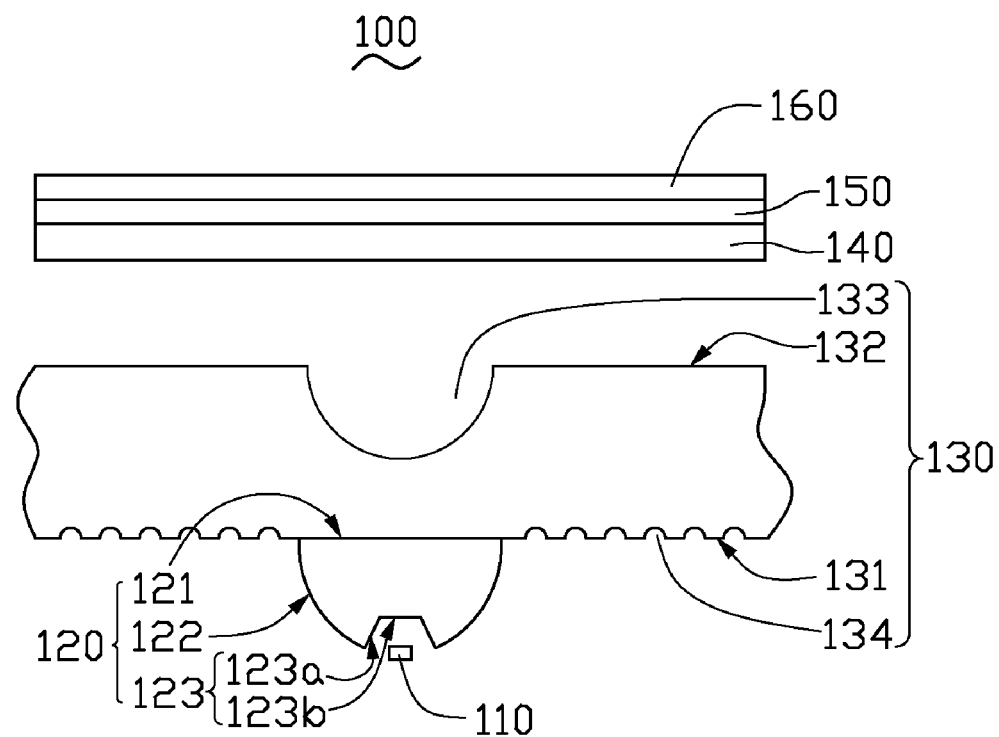
FIG. 3 is a schematic, cross-sectional view of a backlight module in accordance with the first present embodiment showing a surface of the groove of the light-emitting surface being hemispherical shaped.
Figure 4:
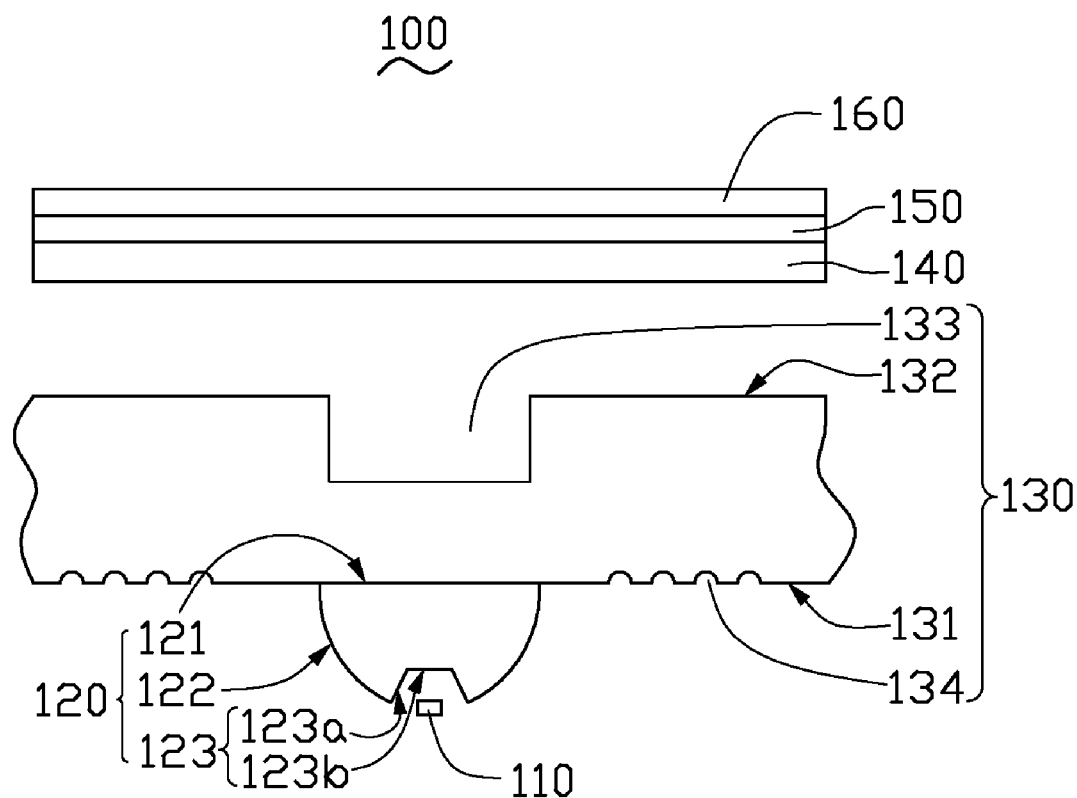
FIG. 4 is a schematic, cross-sectional view of a backlight module in accordance with the first present embodiment showing a surface of the groove of the light-emitting surface being cylindrical shaped.
Figure 5:
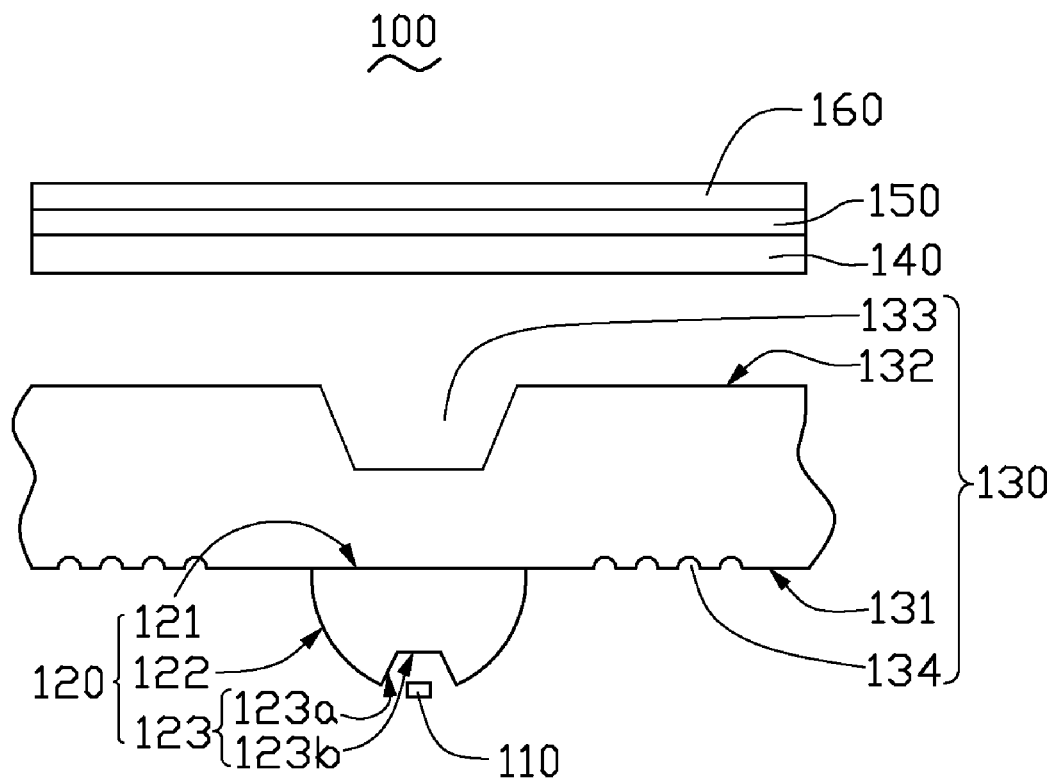
FIG. 5 is a schematic, cross-sectional view of a backlight module in accordance with the first present embodiment showing a surface of the groove of the light-emitting surface being frustum shaped.

Referring to FIG. 2, the backlight module 200, in accordance with a second present embodiment, is provided. The backlight module 200 is similar to the backlight module 100 of the first embodiment except that the reflector 220 and the light guide plate 230 are arranged at a certain distance. The reflector 220 is a cylinder and the reflector 220 has a hemispherical groove defined in a bottom surface thereof. The reflector 220 includes a bottom surface 221, a side surface 222 and a hemispherical light-receiving surface 223.

Since the reflector is arranged between the light source and the light guide plate and the groove is arranged on the area of the light-emitting surface of the light guide plate corresponding to the reflector in accordance with the first and the second embodiment, the light emitted from the light source is guided away from the light guide plate and consequently the light distribution of the region of the light-emitting surface facing the light source is weakened. Correspondingly, the light distribution of the outlying region of the light-emitting surface of the light guide plate is enhanced. Thus, the overall light distribution of the light output by the light guiding plate is more uniform. The corresponding backlight module has a more uniform brightness.

It is to be understood that the above-described embodiments are intended to illustrate rather than limit the invention. Variations may be made to the embodiments without departing from the spirit of the invention as claimed. The above-described embodiments are intended to illustrate aspects of the invention but not restrict the scope of the invention.

What is claimed is:

1. A backlight module, comprising:
   a light source;
   a light guide plate comprising a light incidence surface, a light-emitting surface opposite to the light incidence surface, and a pair of side surfaces connected to the light incidence surface and the light-emitting surface respectively, the light-emitting surface comprising a groove;
   a reflector placed between the light source and the light incidence surface of the light guide plate, located corresponding to the groove of the light-emitting surface of the light guide plate, and comprising a light-receiving surface located facing the light source, a concavity is defined in the reflector and concaved from the light-receiving surface toward the light guide plate, and the light source is received in the concavity.

2. The backlight module as claimed in claim 1, wherein the reflector further comprises a first bottom surface and a first side surface connecting the first bottom surface to the light-receiving surface thereof.

3. The backlight module as claimed in claim 2, wherein the first bottom surface of the reflector is arranged facing the light incidence surface of the light guide plate at a certain distance.

4. The backlight module as claimed in claim 2, wherein the first bottom surface of the reflector is combined with the light incidence surface of the light guide plate.

5. The backlight module as claimed in claim 2, wherein the first side surface of the reflector is spherical, cylindrical or conical.

6. The backlight module as claimed in claim 2, wherein the first bottom surface of the reflector is planar.

7. The backlight module as claimed in claim 1, wherein the light-receiving surface of the reflector comprises a second bottom surface and a second side surface, the second bottom surface is planar, and the second side surface is curved.

8. The backlight module as claimed in claim 7, wherein the second side surface is spherical, cylindrical or conical.

9. The backlight module as claimed in claim 1, wherein the light-receiving surface of the reflector is spherical.

10. The backlight module as claimed in claim 1, wherein a surface of the groove of the light-emitting surface has a reflective material arranged thereon.

11. The backlight module as claimed in claim 1, wherein the outlying region of the light incidence surface of the light guide plate has diffusion structures arranged thereon.

12. The backlight module as claimed in claim 1, further comprises a scattering plate arranged on the side of the light-emitting surface of the light guide plate, facing the light-emitting surface.

13. The backlight module as claimed in claim 12, further comprising a micro-prism system located between the scattering plate and the light-emitting surface of the light guide plate, and the micro-prism system is a light enhancing film or a reflective light enhancing film.

14. The backlight module as claimed in claim 1, wherein a surface of the groove of the light-emitting surface is hemispherical, conical, cylindrical, or frustum.

15. The backlight module as claimed in claim 1, wherein the groove of the light-emitting surface of the light guide plate has a peak pointing to and distant from the light incidence surface.

16. The backlight module as claimed in claim 1, wherein the light source is a light-emitting diode.

17. A backlight module, comprising:
    a light source;
    a light guide plate comprising a light incidence surface, a light-emitting surface opposite to the light incidence surface and a groove recessed in the light-emitting surface, the groove having a peak pointing to and distant from the light incidence surface;
    a reflector placed between the light source and the light incidence surface of the light guide plate, located corresponding to the groove of the light guide plate, and comprising a light-receiving surface located facing the light source.

18. The backlight module as claimed in claim 17, wherein the light guide plate further comprises a plurality of dots distributed in the light incidence surface except an area covered by the reflector.

19. The backlight module as claimed in claim 17, wherein the reflector comprises a first surface optically coupled to the light incidence surface, a second surface opposite to the first surface and a concavity sunken from the second surface towards the first surface, and the light source located within the concavity of the reflector.

20. The backlight module as claimed in claim 17, wherein there is only one peak connecting the inner surface of the groove.

* * * * *